United States Patent
Hengels et al.

(10) Patent No.: US 9,225,680 B2
(45) Date of Patent: Dec. 29, 2015

(54) METHOD AND DEVICE FOR PROVIDING AN IDENTITY IDENTIFIER OF AN ELECTRONIC TERMINAL DEVICE

(75) Inventors: Erik Hengels, Berlin (DE); Arno Roemer, Duesseldorf (DE)

(73) Assignee: VODAFONE GmbH, Duesseldorf (DE)

( * ) Notice: Subject to any disclaimer, the term of this patent is extended or adjusted under 35 U.S.C. 154(b) by 592 days.

(21) Appl. No.: 13/479,605

(22) Filed: May 24, 2012

(65) Prior Publication Data
US 2013/0035104 A1 Feb. 7, 2013

(30) Foreign Application Priority Data

May 24, 2011 (DE) .......................... 10 2011 102 489

(51) Int. Cl.
*H04W 72/04* (2009.01)
*H04L 29/12* (2006.01)
*H04L 29/06* (2006.01)
*H04W 12/04* (2009.01)
*H04W 12/08* (2009.01)
*H04W 8/26* (2009.01)

(52) U.S. Cl.
CPC ............ *H04L 61/6054* (2013.01); *H04L 61/30* (2013.01); *H04L 61/35* (2013.01); *H04L 63/0428* (2013.01); *H04L 63/06* (2013.01); *H04W 12/04* (2013.01); *H04W 12/08* (2013.01); *H04W 8/265* (2013.01)

(58) Field of Classification Search
CPC ..................................................... H04W 72/04
USPC ....................................... 455/450, 433, 458
See application file for complete search history.

(56) References Cited

U.S. PATENT DOCUMENTS

| 2004/0076128 | A1 | 4/2004 | Rao et al. |
| 2006/0212577 | A1* | 9/2006 | Kohnke .......................... 709/227 |
| 2009/0149175 | A1* | 6/2009 | Lopresti et al. ............... 455/433 |
| 2009/0279682 | A1 | 11/2009 | Strandell et al. |

(Continued)

FOREIGN PATENT DOCUMENTS

| DE | 10213073 A1 | 10/2003 |
| EP | 1978772 A1 | 10/2008 |
| GB | 2375872 A | 11/2002 |
| WO | 9927678 A2 | 6/1999 |

(Continued)

OTHER PUBLICATIONS

Printout of GSM Events web page, www.gsmfordummies.com/gsmevents/attach.shtml (Jul. 22, 2009).

*Primary Examiner* — Michael T Vu
(74) *Attorney, Agent, or Firm* — Kriegsman & Kreigsman

(57) ABSTRACT

Method for providing an identity identifier of an electronic terminal device. According to the method, via an interface, the electronic device receives a request from the party to provide an identity identifier, which has at least a request identifier. Via a communication link between the electronic terminal device and a server device assigned to the first communication network, a key to encode an identity identifier assigned to the electronic terminal device is transmitted from the server device to the electronic terminal device. By means of the key, at least the identity identifier in the electronic terminal device is encoded. The at least encoded identity identifier is linked to the request identifier received in the electronic terminal device, transmitted from the electronic terminal device to the server device, and decoded in the server device. The decoded identity identifier, together with the linked request identifier, is provided for transmission to the party.

15 Claims, 1 Drawing Sheet

(56) References Cited

U.S. PATENT DOCUMENTS

2010/0167734 A1    7/2010   Jones et al.
2010/0311468 A1   12/2010   Shi et al.
2013/0183934 A1    7/2013   Roemer et al.
2013/0337748 A1   12/2013   Reunamaki et al.

FOREIGN PATENT DOCUMENTS

| WO | 2004057547 | A1 | 7/2004 |
| WO | 2008047195 | A1 | 4/2008 |
| WO | 2008141947 | A2 | 11/2008 |

* cited by examiner

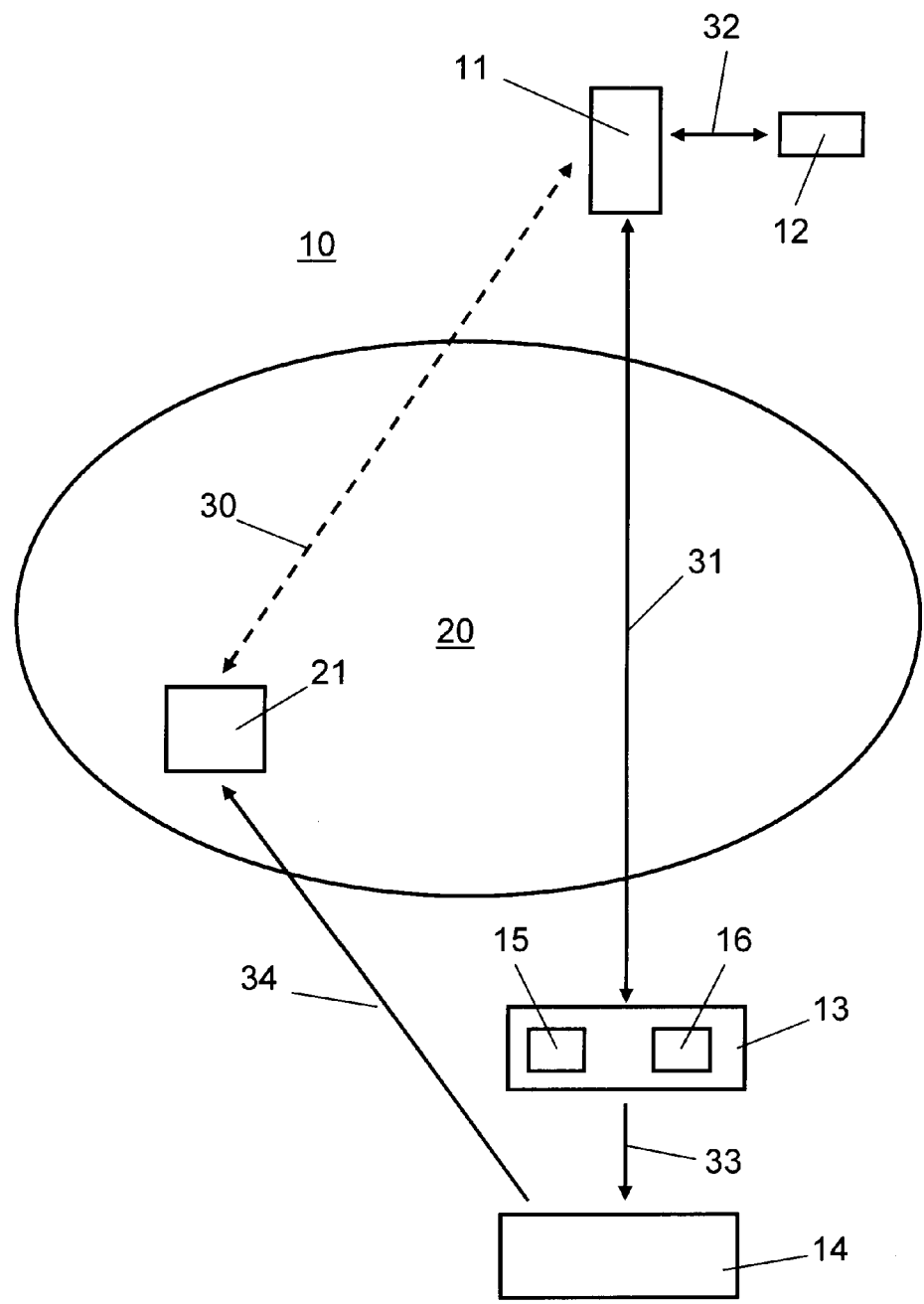

METHOD AND DEVICE FOR PROVIDING AN IDENTITY IDENTIFIER OF AN ELECTRONIC TERMINAL DEVICE

BACKGROUND OF THE INVENTION

The present invention relates first of all to a method for providing an identity identifier of an electronic terminal device that is assigned to a first communication network, particularly a mobile phone network, for a party that is assigned to a second communication network, particularly the Internet, in accordance with the preambles of patent claims 1 and 10. The invention further also relates to a device for providing an identity identifier of an electronic terminal device that is assigned to a first communication network, particularly a mobile phone network, for a party that is assigned to a second communication network, particularly the Internet, in accordance with the preamble of patent claim 14.

Many novel electronic terminal devices, such as, for example, smartphones, netbooks, and the like, can establish data communications both via a mobile phone network and via a fixed network/WLAN, even via RJ-45 jacks in the case of netbooks. In the case of access via a fixed network, the MSISDN is lost as the central identification in the mobile phone network and hence all further applications, such as, for example, mobile payment methods. As a result, the end customer experiences a media disruption when switching from one access variant to another. If need be, he has to log on once again in the portal, because he is no longer recognized by the other access point. Or else mobile services relying on the MSISDN no longer function at all or only very awkwardly.

SUMMARY OF THE INVENTION

The present invention is therefore based on the problem of further developing a method and a device of the type mentioned in the beginning such that the aforementioned media disruption can be prevented.

This problem is solved in accordance with the invention by the method having the features in accordance with the independent patent claim 1, the method having the features in accordance with the independent patent claim 10, and the device in accordance with the features of the independent patent claim 14. Further features and details of the invention ensue from the dependent claims, the description, and the drawing. Features and details that are described in connection with the first method aspect thereby also obviously apply in connection with the second method aspect and vice versa. Features and details that are described in connection with the method in accordance with the invention also obviously apply in connection with the device in accordance with the invention and vice versa, so that, in regard to the disclosure, the individual aspects of the invention are incorporated mutually in full by reference.

In the prior art, it is already known for mobile telephony that, in the case in which a communication is established between the mobile phone and a party via a mobile phone network, the MSISDN (Mobile Subscriber Integrated Services Digital Network Number) is added to the header by the operator of the mobile phone network, so that the party can identify the mobile phone on the basis of the MSISDN.

However, if the electronic terminal device—for example, the mobile phone or smartphone—does not communicate with the party via the mobile phone network, but rather via the Internet, for example, the MSISDN cannot be added to the header by the mobile phone network operator. When such an addition is absent, it is necessary to make available the required identity identifier of the electronic terminal device to the party in another way. The present invention starts at this point.

In accordance with the first aspect of the invention, a method for providing an identity identifier of an electronic terminal device that is assigned to a first communication network, particularly a mobile phone network, is provided for a party that is assigned to a second communication network, particularly the Internet, said method characterized by the following steps:

a) via an interface, the electronic device receives a request from the party to provide an identity identifier, which has at least one request identifier;

b) via a communication link between the electronic terminal device and a server device assigned to the first communication network, a key to encode an identity identifier assigned to the electronic terminal device is transmitted from the server device to the electronic terminal device or else a key to encode an identity identifier assigned to the electronic terminal device is provided in the electronic terminal device;

c) by means of the key, at least the identity identifier in the electronic device is encoded;

d) the at least encoded identity identifier is linked to the request identifier received in the electronic terminal device, transmitted from the electronic terminal device to the server device, and decoded in the server device;

e) the decoded identity identifier with the linked request identifier is provided, via an interface, for transmission to the party.

In accordance with the method of the invention, an identity identifier of an electronic terminal device is provided. The invention is thereby not limited to certain types of electronic terminal devices. In particular, such a device may be one by means of which it is possible to communicate via various communication networks. For example, it can be provided, for example, that the electronic terminal device is capable of communicating both via a first communication network—for instance, in the form of a mobile phone network—and via a second communication network—for example, the Internet. For example, such an electronic terminal device may be a mobile phone, a smartphone, a notebook, a netbook, and the like. An identity identifier is to be provided for this electronic terminal device.

The invention is thereby not limited to certain types of identity identifiers. Fundamentally, an identity identifier may comprise any type of identifier that can be matched by another site. The identity identifier has to be of such a nature that it enables an unequivocal identification of the electronic terminal device. In particular, the identity identifiers are to be designed in such that they can be encoded and decoded. In particular, the identity identifiers are also to be designed such that they can be recognized and known by the server device and/or the party in the second communication network. In connection with a mobile phone network, such an identity identifier may preferably be an IMSI (International Mobile Subscriber Identity) and/or an MSISDN (Mobile Subscriber Integrated Services Digital Network Number). An IMSI consists, in particular, of 15 digits and represents the identification number of a mobile phone. An MSISDN is, in particular, a calling number that is unique and is assigned to a specific user, which a caller dials in order to reach a mobile phone subscriber.

The electronic terminal device is assigned to a first communication network. This means, in particular, that the electronic terminal device is registered and operated in this communication network. For example, the first communication network can be structured as a mobile phone network. Modern electronic terminal devices that are assigned to the first communication network may preferably be designed such that they can communicate via a second communication network, such as, for example, the Internet.

An identity identifier of such an electronic terminal device is to be provided for a party that is assigned to a second communication network. The second communication network may be, for example, the Internet.

A party assigned to the second communication network is, in particular, an entity or installation, such as, for example, a computer, a server device, an operator of a website, or the like. For example, such a party may involve a computer, a server device, an operator of a website, or the like, that is assigned, in particular, to a provider, such as, for example, a service provider. For example, the party can be a provider in the Internet that operates a website, with the website being stored on a server device, a computer, or the like, via which it can be contacted.

The identity identifier is provided in accordance with the invention in the following way:

A) Via an interface, the electronic device receives a request from a party to provide an identity identifier, which comprises at least one request identifier. If the electronic terminal device wants to establish a communication with the party via the second communication network—for example, the Internet—and if the party determines that, in the scope of the communication, the identity identifier of the electronic terminal device assigned to the first communication network—for example, the MSISDN—is absent, the party requests the electronic terminal device to furnish this identity identifier. The electronic terminal device is triggered on the part of the party to furnish this identity identifier and to identify itself through it. In particular, a request is generated for the communication, which, in the case of a service provider or product provider as party, may involve, in particular, an order or the like, this request generally being a query. In order to identify this request, the request is furnished with a specific request identifier. The request identifier may be a session ID in the case of an Internet connection, for example. Preferably, the party accordingly sends a request to the electronic terminal device to furnish the identity identifier of the electronic terminal device, with a request identifier, such as, for example, a session ID, being assigned to this request.

B) Via a communication link between the electronic terminal device and a server device assigned to the first communication network, a key to encode an identity identifier assigned to the electronic terminal device is transmitted from the server device to the electronic terminal device. Such a key is, for example, a part of an encoding/decoding process and is generated by it. The electronic terminal device—for example, an application running on the electronic terminal device—retrieves the key from the server device, for example. The server device produces the key and transmits it to the electronic terminal device. The key can, in particular, be temporarily valid and/or randomly generated. The server device can be, for example, a PROXY, such as, for example, a type of intermediary server in a computer network.

In accordance with an alternative embodiment, it may be provided that, in the electronic terminal device, a key to encode an identity identifier assigned to the electronic terminal device is already provided. In this case, the communication step described above may be dispensed with.

The two aforementioned method steps A) and B) may take place in any sequence. For example, the transmission of the key can be initiated once the electronic terminal device has received the request of the party. Naturally, it may also be provided that, before the electronic terminal device establishes a communication with the party assigned to the second communication network, it first initiates the transmission of the key from the server device, so that the key is already available in the electronic terminal device during transmission of the request.

C) In the next step, at least the identity identifier in the electronic terminal device is encoded by means of the key. Naturally, it may also be provided that, in addition, parts of the request, such as, for example, the request identifier, are encoded as well.

D) The at least encoded identity identifier is linked to the request identifier received in the electronic terminal device, with it being possible also to encode this request identifier, for example. The encoded data are transmitted from the electronic terminal device to the server device and decoded and, if need be, unpacked beforehand in the server device. Optionally, the request or the request identifier can also be checked in the server device to determine, for example, whether it is still valid. For example, it can be checked whether or not certain predetermined time windows have already expired.

E) Subsequently, the decoded identity identifier, together with the linked request identifier, is provided, via an interface, for transmission to the party. This can take place in different ways, so that the invention is not limited to specific exemplary embodiments. Some preferred embodiments will be described in detail in the further course of the description.

Preferably, the decoded identity identifier, together with the linked request identifier, can be provided, via an interface assigned to the server device, for transmission to the party.

In another embodiment, it may be provided that the decoded identity identifier, together with the linked request identifier, is transmitted from the server device to a target system, which is assigned to first communication network, and that the decoded identity identifier, together with the linked request identifier, is provided, via an interface assigned to the target system, for transmission to the party. The target system may be, for example, a billing system, a forwarding system, or the like.

The server device and the target device are preferably components of the first communication network, such as, for example, a mobile phone network. In particular, they may be provided in the core network of such a communication network.

Depending on the embodiment, it may be provided that the server device and the target device are different devices. Naturally, it may also be provided that the two devices are combined in a single device.

Preferably, the electronic terminal device can establish a communication link between the electronic terminal device and the server device by means of a browser or an application, which runs on the electronic terminal device and/or is implemented on it.

Depending on the embodiment, it may be provided that the communication link between the electronic terminal device and the server device is established via the first communication network and/or via the second communication network. For example, it may be provided that the communication link runs via the Internet. For example, it may also be provided that the communication link runs via a mobile phone network. Of course, applications are also conceivable in which both communication networks are employed and parts of the link proceed via the first communication network and parts of the link proceed via the second communication network.

Preferably, in the case that a key to encode an identity identifier assigned to the electronic terminal device is transmitted via the communication link between the electronic terminal device and the server device, the electronic terminal device can establish a communication link to the server device, with the electronic terminal device transmitting a request, via the communication link, for transmission of a key to the server device and a key being generated or produced in the server device and then the key being transmitted from the server device, via the communication link, to the electronic terminal device.

For example, it may be provided that a key is generated only when the request of the electronic terminal device takes place. In another embodiment, it may be provided that a key is already generated beforehand and kept available in the server device, so that, when it is needed, it can be retrieved and transmitted to the electronic terminal device. In another embodiment, it may also be provided that, when requested to do so, the electronic terminal device transmits the request transmitted by the party and/or the request identifier directly to the server device. The request may involve, in particular, a query of the party to the electronic terminal device to provide an identity identifier.

Preferably, it may be provided that the encoding of at least the identity identifier takes place in a chip card application in the electronic terminal device. In this case, the chip card application may, for example, be provided in the form of a chip card in the electronic terminal device. In another embodiment, it is also conceivable that the chip card application is implemented in the form of a software application in the electronic terminal device. Chip cards, which are also often referred to as a smartcard or Integrated Circuit Card (ICC), have, in particular, an integrated circuit, which may include hardware logic, a memory storage device, or else a microprocessor. Preferably, it may be provided that the chip card application is a SIM application. A SIM (Subscriber Identity Module) is, in particular, a chip card that is inserted into a mobile phone and serves for identification of the user in the mobile phone network. It is used to provide mobile phone provider subscribers with mobile telephone connections and data connections.

Preferably, as identity identifier, an IMSI (International Mobile Subscriber Identity) assigned to the user of the electronic terminal device and/or an MSISDN (Mobile Subscriber Integrated Services Digital Network Number) assigned to the user of the electronic terminal device can be encoded. The IMSI is, in particular, deposited or stored on the chip card—for example, a SIM—or in a chip card application—for example, a SIM application. In the case that, as identity identifier, an IMSI assigned to the user of the electronic terminal device is encoded, the encoded IMSI may preferably be transmitted via the communication link from the electronic terminal device to the server device, with at least the IMSI being decoded in the server device and with the decoded IMSI being assigned by means of the server device to the MSISDN assigned to the user of the electronic terminal device as identity identifier. Preferably, it is provided that the MSISDN is provided as identity identifier of the user of the electronic terminal device.

The method in accordance with the first aspect of in the invention can be used, in particular, to send a message in the form of an SMS, for instance, to the server device via an application and/or a browser in the electronic terminal device, this message containing, besides the encoded identity identifier, also the request identifier and possibly also information about the target, namely, the party in the second communication network. This information is then further transmitted to the party via the server device, such as, for example, via a Short Message Service Center (SMSC) and another entity for checking, for example, the target device, and billing the identity—for example, the MDSIDN—of the electronic terminal device.

The method offers, in particular, a carrier-independent SIM identification.

Important areas of application of the method in accordance with the invention are, for example, service providers that offer their services to the end customer both during Internet access via mobile telephony—for instance, GSM, UMTS, LTE, and the like—and also via WLAN, LAN, and the like. Examples include payment methods, identity management, and the like.

In the case of a mobile phone network as first communication network, the continued maintenance of the MSISDN for identification of the end customer is ensured. In this way, it is possible to further use, in particular, all existing mobile services, regardless of access.

A preferred embodiment consists, in particular, in the combination of the SIM application with the server device—for example, a proxy—which both ensures the validity of the identity and also protects the data in the Internet against unauthorized use and offers a basis for commercial use/billing. In addition, the method is designed for use by all mobile network operators.

Provided in accordance with a second aspect of the invention is a method based on the method in accordance with the first aspect of the invention, in which, however, the party is now a component part of the method. Therefore, in connection with the second aspect of the invention, the remarks made about the first aspect of the invention are incorporated in full by reference.

In accordance with the second aspect of the invention, a method for providing an identity identifier of an electronic terminal device that is assigned to a first communication network, particularly a mobile phone network, is provided for a party that is assigned to a second communication network, particularly the Internet, said method being characterized by the following steps:

a) the party transmits a request to provide an identity identifier, which comprises at least one request identifier, to the electronic terminal device;

b) via an interface, the electronic device receives the request from the party;

c) via a communication link between the electronic terminal device and a server device assigned to the first communication network, a key to encode an identity identifier assigned to the electronic terminal device is transmitted from the server device to the electronic terminal device or else a key to encode an identity identifier assigned to the electronic terminal device is provided in the electronic terminal device;

d) by means of the key, at least the identity identifier in the electronic device is encoded;

e) the at least encoded identity identifier is linked to the request identifier received in the electronic terminal device, transmitted from the electronic terminal device to the server device, and decoded in the server device;

f) the decoded identity identifier, together with the linked request identifier, is provided, via an interface, for transmission to the party.

Preferably, the method comprises at least one method step of the method described above in accordance with the first aspect of the invention, so the corresponding remarks made further above are incorporated in full by reference.

When the party receives the decoded identity identifier, together with the linked request identifier, the following method steps are preferably executed on the part of the party. The transmitted request identifier is compared to the stored request identifiers. If the request identifiers agree, the identity identifier linked to the transmitted request identifier is assigned to a request that is linked to the stored request identifier. In this way, the party can clearly assign the identity identifier of the electronic terminal device, for example, its MSISDN, to the request.

Preferably, the decoded identity identifier, together with the linked request identifier, is transmitted to the party via an interface and a communication link assigned to the interface. This may involve, for example, a separate connection between the party and the operator of the first communication network. It may involve, for example, a wired or wireless link, such as, for example, a telephone connection and/or a data line, an Internet connection, a VPN tunnel, and the like.

Several concrete exemplary embodiments will be discussed below, which, as a supplement to the preceding embodiments, also highlight the nature of the present invention.

For example, the party may be a provider in the Internet that operates a website, with the website being stored on a server device, a computer, or the like, via which it can be contacted. The user of an electronic terminal device, such as, for example, a smartphone, which is assigned to a mobile phone network, visits the website of the party via his electronic terminal device by way of the second communication network, such as, for example, the Internet. Because the communication is not made via the mobile phone network, but rather via the Internet, the identity identifier of the electronic terminal device, such as, for example, the MSISDN, is absent in the communication in the first communication network. The party determines that the identity identifier is absent in, for example, the header. The party sends via the Internet connection, for example, a request—for example, an identity request—preferably together with a request identifier, such as, for instance, a session ID that serves for later assignment, to the electronic terminal device, such as, for example, a browser or application running there. The electronic terminal device asks for the key at the server device in the first communication network, such as, for example, a proxy. The electronic terminal device further transmits the key and, if need be, the request identifier, to a SIM application in the electronic terminal device. The SIM application uses the key to encode an identity identifier of the electronic terminal device, for example, the IMSI and, if need be, the request identifier. The electronic terminal device sends the encoded data to the server device via, for example, the browser and/or the application. The server device decodes the encoded data and, in the case of an IMSI, converts it preferably to an MSISDN. Alternatively, the server device can assign the correspondingly associated MSISDN to the IMSI. Optionally, the request and/or the request identifier can also be checked in the server device. Optionally, the decoded and processed data—for example, the session ID and the MSISDN—can be transmitted initially to a target system, such as, for example, an M3p system, where the data are further processed. Subsequently, the data are transmitted, preferably via a separate connection, either from the server device or from the target device to the party for further use there.

Provided in accordance with yet another aspect of the invention is a device for providing an identity identifier of an electronic terminal device that is assigned to a first communication network, particularly a mobile phone network, for a party that is assigned to a second communication network, particularly the Internet. This device is characterized by a server device, which comprises an interface for producing a communication link between the server device and an electronic terminal device, a device for generating a key for encoding an identity identifier assigned to the electronic terminal device, a device for decoding an encoded identity identifier that has been received by the electronic terminal device and is linked to a request identifier of the party, with the device further having an interface for transmitting the decoded identity identifier, together with the linked request identifier, to the party.

For example, the interface can be provided in the server device for transmitting the decoded identity identifier, together with the linked request identifier, to the party. Optionally, the device can have, in addition to the server device, also a target system as described further above. In such a case, the interface may also be located in the target system.

The device in accordance with the invention, particularly the server device, which can be designed as a PROXY, and/or the target system are preferably components of the first communication network, which, for example, can be a mobile phone network. In such a case, the elements mentioned may be provided in the core network, for example.

Preferably, the device comprises means for carrying out the method described above, so that the corresponding remarks are incorporated in full by reference.

BRIEF DESCRIPTION OF THE DRAWING

The invention will now be described in detail on the basis of an exemplary embodiment with reference to the attached drawing. The sole FIGURE shows, in schematic illustration, a network environment in which the method in accordance with the invention can be executed.

DETAILED DESCRIPTION OF THE INVENTION

Illustrated in the FIGURE is, first of all, a first communication network 10, which is designed as a mobile phone network in the exemplary embodiment. Assigned to the mobile phone network 10 are electronic terminal devices 11, which are designed as smartphones in the exemplary embodiment. Illustrated in the FIGURE for clarification is only one smartphone 11. The smartphone 11 disposes over a chip card application 12, which is designed as a SIM application in the exemplary embodiment. Further assigned to the mobile phone network 10 is a server device 13, which may be designed as a PROXY, for example. The server device 13 comprises a device 15 for generating a key to encode an identity identifier assigned to the smartphone 11 as well as a device 16 to decode an identity identifier received by the smartphone 11.

In addition, the mobile phone network 10 disposes over a target system 14, which may be designed as an HLR, as a forwarding system, as a billing system, or the like.

Further provided is a second communication network 20, which is designed as the Internet in the exemplary embodiment. Assigned to the Internet 20 is a party 21. For example, the party 21 may be an Internet provider 20, which operates a website, with the website being stored on a server device, a computer, or the like, via which it can be contacted.

In prior art, it is already known for smartphones that, in the case that a communication between the smartphone and a party is established via a mobile phone network, the MSISDN (Mobile Subscriber Integrated Services Digital Network Number) is added to the header by the operator of the mobile phone network, so that the party can identify the smartphone on the basis of the MSISDN. However, if the smartphone communicates with the party not via the mobile phone network, but rather via the Internet, for example, the MSISDN can no longer be added to the header by the mobile phone network operator. If such an addition is absent, it is necessary to make available the required identity identifier of the electronic terminal device to the party in another way. The present invention starts at this point.

If the smartphone 11 establishes a communication link to the party 21 via the Internet 20, this being illustrated in the FIGURE by the dashed arrow 30, and if the party 21 determines that a corresponding identity identifier, such as, for example, the MSISDN, of the smartphone 11 is absent, the party 11 sends a request to the smartphone 11, asking it to identify itself. The transmission of the request is also illustrated in the FIGURE by the dashed arrow 30. The request is furnished with a request identifier, such as, for example, a session ID, in order to facilitate a later assignment.

In order to provide such an identity identifier, the smartphone establishes a communication link to the server device 13, this being illustrated by the arrow 31. The communication link proceeds preferably via the Internet 20, but can also occur via the mobile phone network 10.

The smartphone now sends a request to the server device via the communication link that a key is needed in order to encode the identity identifier of the smartphone 11. Via the device 15, the server device 13 produces a key, which can be, for example, a temporary or random key, by means of which the identity identifier of the smartphone 11 can be encoded. This key is sent via the communication link 31 back to the smartphone 11. The implementation of the method can be carried out in the smartphone 11 by means of, for example, a browser and/or an application. Together with the query, it is possible, optionally, to transmit also the request and/or the request identifier of the party 11.

After the key has been received, the identity identifier and, if need be, the request and/or the request identifier are encoded in the smartphone 11. This takes place preferably in the SIM application 12 and is marked in the FIGURE by the arrow 32. Located on the SIM is, for example, the IMSI of the smartphone and/or its MSISDN. For example, the IMSI and/or MSISDN can be encoded.

The encoded data are subsequently transmitted from the smartphone 11 via the communication link 31 to the server device 13. There, the data are decoded by means of the device 16. The server device 13 now has available the identity identifier of the smartphone 11, coupled with the request or the request identifier of the party 11. If the identity identifier is the MSISDN, the server device 13 now has available the decoded MSISDN. If the identity identifier is the IMSI, the server device 13 has available the decoded IMSI. In this case, the server device 13 generates or procures the MSISDN of the smartphone that matches the IMSI by transforming or appropriately converting the IMSI, for example.

The now decoded data, which may involve the MSISDN, for example, which is linked to the request identifier of the party 11—for example, the session ID—can optionally be further transmitted initially to the target system 14, which is illustrated in the FIGURE by the arrow 33. Subsequently, the decoded data are transmitted via a separate connection, such as, for example, a separate communication line 34, to the party 21.

When the party 21 receives the decoded identity identifier, together with the linked request identifier, the following method steps preferably are executed on the part of the party 21. The transmitted request identifier, such as, for example, the session ID, is compared to the stored request identifiers. If the request identifiers agree, the identity identifier linked to the transmitted request identifier—for example, the MSISDN—is assigned to a request that is linked to the stored request identifier. In this way, the party 21 can clearly assign the identity identifier of the smartphone 11, such as, for example, its MSISDN.

LIST OF REFERENCE CHARACTERS 10 first communication network (mobile phone network)
11 electronic terminal device (smartphone)
12 chip card application (SIM application)
13 server device (PROXY)
14 target system
15 device for generating a key for encoding an identity identifier assigned to the electronic terminal device
16 device to decode an encoded identity identifier received by the smartphone
20 second communication network (Internet)
21 party
30 communication link smartphone—party
31 communication link smartphone—server device
32 encoding step
33 communication link server—target system
34 communication line

The invention claimed is:

1. A method for providing an identity identifier of an electronic terminal device that is assigned to a first communication network, particularly a mobile phone network, for a party that is assigned to a second communication network, particularly the Internet, characterized by the following steps:

a) via an interface, the electronic device, which is assigned to the first communication network, receives a request from the party, which is assigned to the second communication network, to provide an identity identifier, which has at least a request identifier;

b) via a communication link between the electronic terminal device, which is assigned to the first communication network, and a server device assigned to the first communication network, a key to encode an identity identifier assigned to the electronic terminal device is transmitted from the server device to the electronic terminal device, or a key to encode the identity identifier assigned to the electronic terminal device is provided in the electronic terminal device;

c) by means of the key, at least an identity identifier in the electronic terminal device is encoded;

d) the at least encoded identity identifier is linked to the request identifier received in the electronic terminal device, transmitted from the electronic terminal device to the server device, and decoded in the server device;

e) the decoded identity identifier, together with the linked request identifier, is provided, via an interface, for transmission to the party, which is assigned to the second communication network.

2. The method according to claim 1, further characterized in that the decoded identity identifier, together with the linked request identifier, is provided, via an interface assigned to the server device, for transmission to the party.

3. The method according to claim 1, further characterized in that the decoded identity identifier, together with the linked request identifier, is transmitted from the server device to a target system, which is assigned to the first communication network, and that the decoded identity identifier, together with the linked request identifier, is provided, via an interface assigned to the target system, for transmission to the party.

4. The method according to claim 1, further characterized in that the electronic terminal device establishes, by means of a browser or an application, which runs on the electronic terminal device and/or is implemented in it, a communication link between the electronic terminal device and the server device.

5. The method according to claim 1, further characterized in that the communication link between the electronic terminal device and the server device is established via the first communication network and/or via the second communication network.

6. The method according to claim 1, further characterized in that, in the case that, via the communication link between the electronic terminal device and the server device, a key to encode an identity identifier assigned to the electronic terminal device is transmitted from the server device to the electronic terminal device, the electronic terminal device establishes a communication link to the server device, that the electronic terminal device transmits a request for transmission of a key to the server device via the communication link, that a key is produced or provided in the server device, and that the key is transmitted from the server device, via the communication link, to the electronic terminal device.

7. The method according to claim 1, further characterized in that at least the identity identifier is encoded in a chip card application in the electronic terminal device, particularly in a SIM application.

8. The method according to claim 1, further characterized in that, as the identity identifier, an IMSI (International Mobile Subscriber Identity) assigned to the electronic terminal device and/or an MSISDN (Mobile Subscriber Integrated Services Digital Network Number) assigned to the electronic terminal device is encoded.

9. The method according to claim 8, further characterized in that, in the case that, as the identity identifier, an IMSI assigned to the electronic terminal device is encoded, the encoded IMSI is transmitted, via the communication link, from the electronic terminal device to the server device, that at least the IMSI is decoded in the server device, and that, by means of the server device, an MSISDN assigned to the electronic terminal device is assigned to the decoded IMSI as the identity identifier.

10. A method for providing an identity identifier of an electronic terminal device that is assigned to a first communication network, particularly a mobile phone network, for a party that is assigned to a second communication network, particularly the Internet,
characterized by the following steps:
a) the party, which is assigned to the second communication network, transmits a request to provide an identity identifier, which has the at least one request identifier, to the electronic terminal device, which is assigned to the first communication network;
b) via an interface, the electronic device, which is assigned to the first communication network, receives the request from the party, which is assigned to the second communication network;
c) via a communication link between the electronic terminal device, which is assigned to the first communication network, and a server device assigned to the first communication network, a key to encode an identity identifier assigned to the electronic terminal device is transmitted from the server device to the electronic terminal device, or a key to encode an identity identifier assigned to the electronic terminal device is provided in the electronic terminal device;
d) by means of the key, at least the identity identifier is encoded in the electronic terminal device;
e) the at least encoded identity identifier is linked to the request identifier received in the electronic terminal device, transmitted from the electronic terminal device to the server device, and decoded in the server device;
f) the decoded identity identifier, together with the linked request identifier, is transmitted, via an interface, to the party, which is assigned to the second communication network.

11. The method according to claim 10, further characterized in that the decoded identity identifier, together with the linked request identifier, is provided, via an interface assigned to the server device, for transmission to the party.

12. The method according to claim 10, further characterized in that, on the part of the party, the transmitted request identifier is compared to the stored request identifiers and that, if the request identifiers agree, the identity identifier linked to the transmitted request identifier is assigned to a request that is linked to the stored request identifier.

13. The method according to claim 10, further characterized in that the decoded identity identifier, together with the linked request identifier, is transmitted, via an interface and a communications line assigned to the interface, to the party.

14. A device for providing an identity identifier of an electronic terminal device that is assigned to a first communication network, particularly a mobile phone network, for a party that is assigned to a second communication network, particularly the Internet,
characterized by a server device, which is assigned to the first communication network, having an interface for producing a communication link between the server device and an electronic terminal device, which is assigned to the first communication network, a device for generating a key for encoding an identity identifier assigned to the electronic terminal device, a device for decoding an identity identifier received by the electronic terminal device, which is linked to a request identifier of the party, which is assigned to the second communication network, with the device further having an interface for transmitting the decoded identity identifier, together with the linked request identifier, to the party, which is assigned to the second communication network.

15. A device for providing an identity identifier of an electronic terminal device that is assigned to a first communication network, particularly a mobile phone network, for a party that is assigned to a second communication network, particularly the Internet,
characterized by an interface, which is assigned to the electronic terminal device, said interface being adapted for receiving a request from the party, which is assigned to the second communication network, to provide an identity identifier, which has at least a request identifier, a server device, which is assigned to the first communication network, having an interface for producing a communication link between the server device and the electronic terminal device, which is assigned to the first communication network, a device for generating a key for encoding an identity identifier assigned to the electronic terminal device, a device for decoding an identity identifier received by the electronic terminal device, which is linked to a request identifier of the party, which is assigned to the second communication network, with the device further having an interface for transmitting a decoded identity identifier, together with a linked request identifier, to the party, which is assigned to the second communication network, and further characterized in that it has means for carrying out the method according to claim 1 or 10.

* * * * *